United States Patent [19]

Sasson

[11] Patent Number: 4,477,281

[45] Date of Patent: Oct. 16, 1984

[54] CORROSION INHIBITING ORGANIC COATINGS

[76] Inventor: Ezra Sasson, Rehov Pines 81, Petach Tikva, Israel

[21] Appl. No.: 434,489

[22] Filed: Oct. 15, 1982

Related U.S. Application Data

[63] Continuation-in-part of Ser. No. 267,391, May 26, 1981.

[30] Foreign Application Priority Data

Jun. 1, 1980 [IL] Israel ................................. 60203

[51] Int. Cl.$^3$ .............................................. C09D 5/08
[52] U.S. Cl. .............................. 106/14.34; 106/14.22; 106/14.26; 106/219; 106/230; 106/231; 106/239; 106/268; 106/271

[58] Field of Search ............... 106/14.34, 230, 231, 106/14.22, 14.26, 219, 239, 268, 271

[56] References Cited

U.S. PATENT DOCUMENTS

| | | | |
|---|---|---|---|
| 1,919,454 | 7/1933 | Ware | 106/230 |
| 1,979,787 | 11/1934 | Arveson | 106/231 |
| 2,338,176 | 1/1944 | Goepfert | 106/230 |
| 3,088,876 | 5/1963 | Buth | 106/230 |

*Primary Examiner*—Lorenzo B. Hayes
*Attorney, Agent, or Firm*—Browdy and Neimark

[57] ABSTRACT

A corrosion inhibiting coating comprises a mixture of waxes, petroleum jelly, a hardener and a solvent. In particular, a corrosion inhibiting coating comprises candelilla wax, carnauba wax, microcrystalline waxes, white petrolatum, an oleoresin, lanolin and a solvent.

4 Claims, No Drawings

CORROSION INHIBITING ORGANIC COATINGS

This application is a continuation-in-part of applicant's copending application Ser. No. 267,391, filed May 26, 1981.

FIELD OF THE INVENTION

The present invention relates to corrosion inhibiting coatings for metals.

BACKGROUND OF THE INVENTION

Many metals of industrial importance undergo a chemical change when exposed to the action of air and water. This change often results in the production of spots of differently colored material scattered over the surface of the metal, e.g., reddish brown rust on iron and steel, white specks on aluminum and blue or green layers on copper. The change not only spoils the appearance of the metal but sometimes penetrates so deeply into the metal that its mechanical properties are seriously impaired. This deterioration of a substance or its properties because of a reaction with the environment is commonly termed corrosion.

Corrosion of metals is essentially an oxidative process whose exact mechanism is often quite complicated. Simply stated, the rusting of iron, for example, requires three elements: water, oxygen and some impurity often provided by the carbon dioxide present in the air. The action of the impurity is presumably to provide a feebly conducting solution with the water and so set up an electrolytic effect. Iron salts are formed initially but are subsequently oxidized to red-brown rust whose chemical composition is $Fe_2O_3.H_2O$. Similar processes occur with other metals.

It follows, of course, that corrosion may be prevented, or at least retarded, by retardation of the electrolytic effect or by preventing contact of the metal surface with water and air. Preparations containing sodium dichromate or arsenic salts are "inhibitors" and are effective in preventing corrosion because they readily adsorb to the metallic surface and retard the flow of current thus stifling the electrolytic effect.

Alternatively, organic coatings may be applied as paints or protective sheaths which function to seal out water and air from the metal surface. Examples of some such corrosion inhibiting coatings are shown in U.S. Pat. Nos. 2,430,846 to Morgan, 2,471,638 to McCarthy and 2,995,532 to Cantrell.

SUMMARY OF THE INVENTION

It is an object of the present invention to provide a corrosion inhibiting coating which is economical, effective and easily applied to the product.

There is thus provided in accordance with the present invention a corrosion inhibiting coating comprising a mixture of waxes, petroleum jelly, a hardener which is preferably an oleoresin, and a solvent.

There is further provided according to a preferred embodiment of the present invention a corrosion inhibiting coating comprising candelilla wax, carnauba wax, microcrystalline waxes, white petrolatum, an oleoresin, lanolin and a solvent. In particular, the solvent comprises a mixture of toluene, butyl acetate and kerosene.

DETAILED DESCRIPTION OF THE INVENTION

The corrosion inhibiting coatings of the present invention generally comprise a mixture of waxes, both microcrystalline waxes and waxes of vegetable origin, a white grease, a hardener which is preferably an oleoresin or a balsam, and solvents.

A great variety of waxes are useful in the coatings of the present invention. These include candelilla wax and carnauba wax, as well as other waxes of vegetable origin, and microcrystalline waxes which give the coating more uniform characteristics. A preferred mixture of microcrystalline waxes for use in the present invention is that marketed under the registered trademark Multiwax by Witco Chemical Co., of the United States of America.

The grease or petroleum jelly which is useful in the coatings of the present invention is that known as white petrolatum. Any such emulsion of soft paraffins (highly saturated hydrocarbons) dispersed in heavy oils can be used. A particularly effective petroleum jelly is Petrolatum Lavan, a registered trademark of Sonol Oil Company, of Haifa, Israel, for its white petroleum jelly.

The hardener of the coatings of the present invention is a balsam or other oleoresin, that is, a natural product consisting of essential or volatile oils admixed with resins. Common rosin, or colophony, the residuum consisting chiefly of abietic acid left behind in the retorts when crude turpentine from pine trees is distilled, is a particularly useful hardener. Another preferred hardener is Balzamhart, a registered trademark of Uzin, of West Germany, for its balsam resin.

The solvents useful in the coatings of the present invention are those which will permit the mixing of all of the above ingredients into a mixture of the desired consistency for application to the metals to be protected. A particularly useful combination of solvents is a mixture of toluene, butyl acetate and kerosene.

It will be appreciated that there are any number of coatings according to the present invention which will have the desired corrosion inhibiting properties and which will be easy to apply. One preferred coating, the best embodiment known to the inventors, comprises the following ingredients:

Balzamhart (Uzin, W. Germany): 200 g
Multiwax (Witco Chemical Co., U.S.A.): 120 g
Petrolatum Lavan (Sonol Oil Co., Israel): 120 g
Kerosene: 120 g
Toluene: 120 g
Lanolin: 100 g
Candelilla Wax (Witco Chemical Co., U.S.A.): 25 g
Butyl Acetate: 20 g
Carnauba Wax (Witco Chemical Co., U.S.A.): 10 g It will be appreciated by those skilled in the art that the present invention is not limited to the specific embodiments described hereinabove by way of example. Rather, the scope of the invention is limited solely by the claims which follow.

I claim:

1. A corrosion inhibiting coating for metal comprising:
   candelilla wax;
   carnauba wax;
   microcrystalline waxes;
   white petrolatum;
   an oleoresin hardener;
   lanolin; and a solvent comprising a mixture of kerosene and toluene.

2. A corrosion inhibiting coating according to claim 1 and wherein said hardener is rosin.

3. A corrosion inhibiting coating according to claim 1 and wherein: said solvent comprises a mixture of toluene, butyl acetate and kerosene.

4. A method of inhibiting corrosion of a metal, comprising applying to said metal a corrosion inhibiting coating according to claim 1.

* * * * *